Patented Oct. 16, 1928.

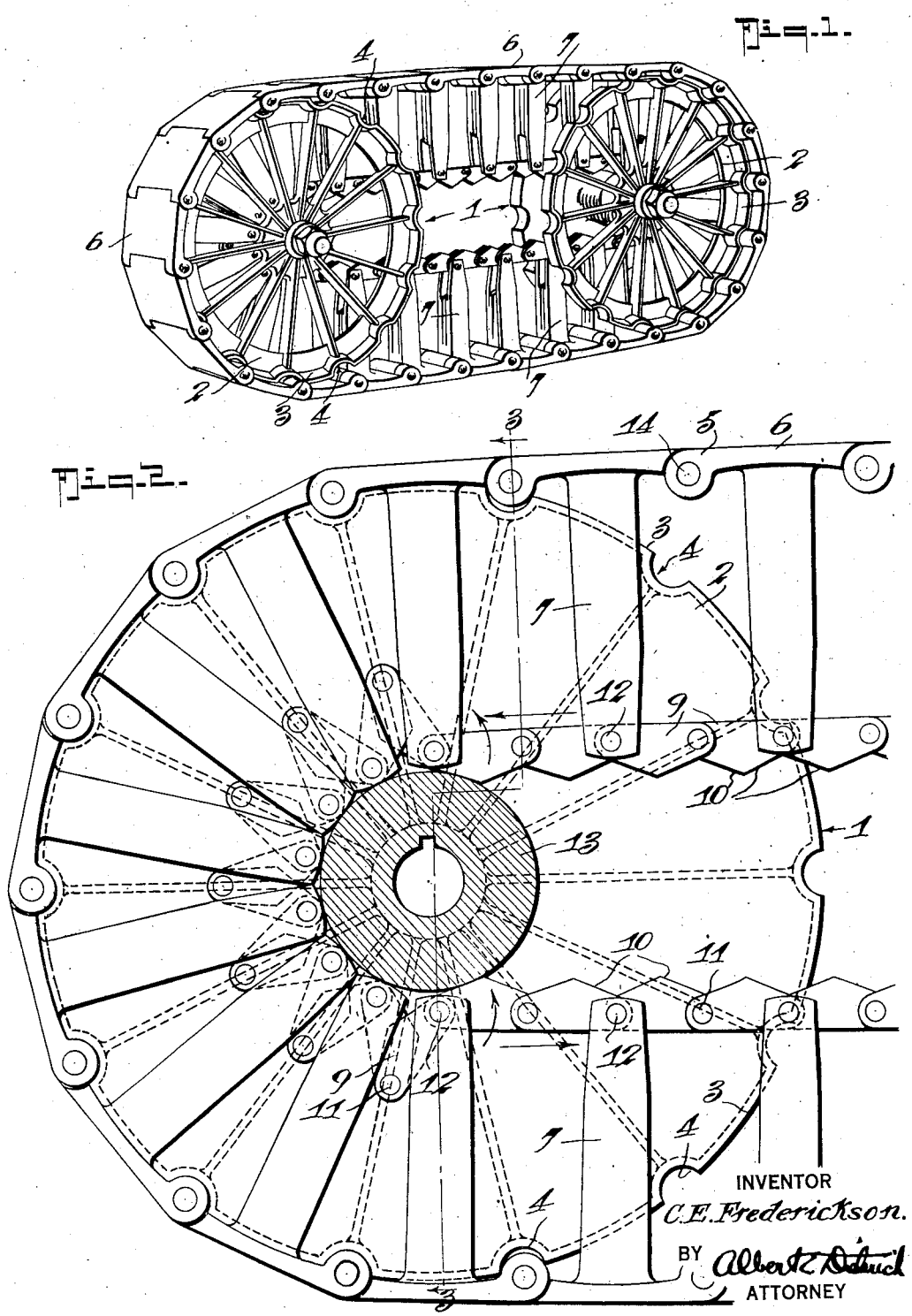

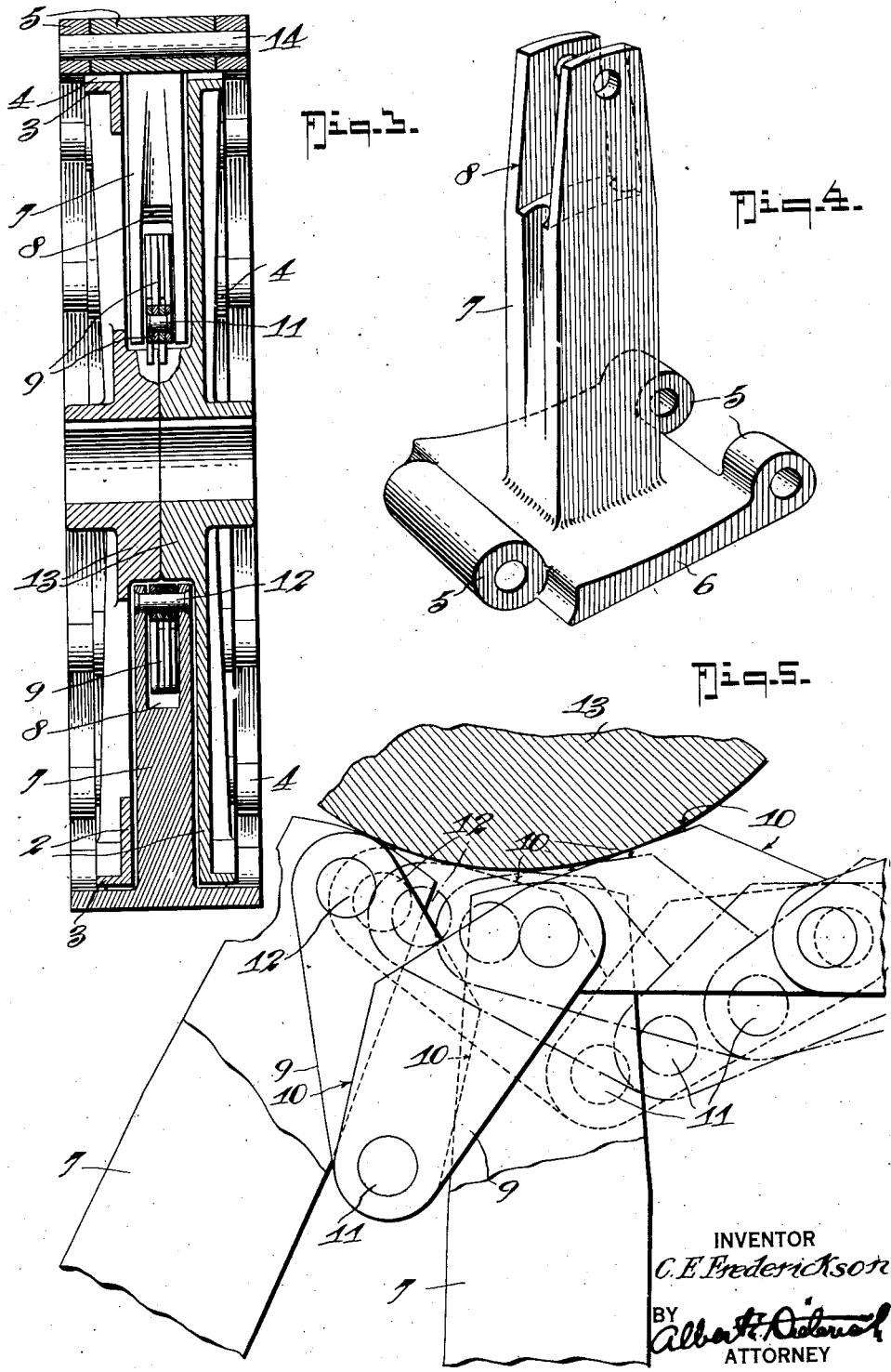

1,687,834

UNITED STATES PATENT OFFICE.

CLAYTON E. FREDERICKSON, OF CHICAGO, ILLINOIS.

TRACTION WHEEL AND CHAIN.

Application filed November 23, 1927. Serial No. 235,340.

My invention has for its object to provide a tractor chain of the truss-link type with provisions for causing the tie links (that join the ends of the arms of the traction links) to "break" with a gradual movement and with as little noise as possible and to provide means whereby when the links open (after passing around the wheels) they will open with a slow motion and not snap open as is the case with chains heretofore used.

Other objects will in part be obvious and in part be referred to hereinafter.

To the attainment of the aforesaid objects and ends, my invention consists in the novel details of construction and in the combination, connection and arrangement of parts, hereinafter more fully described and then pointed out in the appended claims.

In the drawings:—

Figure 1 is a perspective view of a tractor wheel and chain employing my invention.

Figure 2 is an enlarged vertical longitudinal section showing the action of the wheel hub and cam-tie links in "breaking" and straightening out the chain.

Figure 3 is a cross section on the line 3—3 of Figure 2.

Figure 4 is a detail perspective view of one of the traction links.

Figure 5 is a diagrammatic vertical section illustrating the camming action of the cam-tie links, avoiding snapping during the straightening out of the chain.

In the drawings, in which like numerals of reference indicate like parts in all the figures, 1 represent the tractor wheels having spaced sides 2 whose peripheries 3 are provided with recesses 4 for the reception of the hinges of the traction links. The sides 2 of the wheel 1 are spaced apart by a hub 13 of cylindrical form and of such diameter as to cooperate with the cam-tie links hereinafter referred to.

Each of the traction links of the chain consists of a traction plate 6 having hinge ears 5 interconnected by hinge pins 14. Each link also includes an arm 7 bifurcated at its end as at 8 to permit reception of the ends of the connecting cam-tie links 9, the cam faces 10 of which face inwardly or toward the hubs of the wheels, The cam-tie links 9—9 are pivotally connected to one another as at 11 and pivotally connected at 12 to the arms.

It will be seen that these cam-tie links perform a dual function in that they serve to hold the traction links against disconnection and truss the chain so that where it extends between the pair of guide wheels the chain will lie substantially horizontally or straight; the cam-tie links perform the second function in cooperation with the hubs of the wheels to "break" the chain where it passes around the wheels and in straightening out they prevent the chain from snapping to the straightened position, thus reducing wear and eliminating as much noise as possible.

Practice has shown that with my construction of tractor chain and wheels, by reason of the action of the cam-tie links in cooperation with the wheel hubs the chain operates much more smoothly and with less noise than is the case with other types of tractor chains.

From the foregoing description, taken in connection with the accompanying drawings, it is thought the construction, operation and advantages of my invention will be clear to those skilled in the art to which it relates.

What I claim is:

1. In a tractor, a bridge truss chain and wheel cooperating therewith, said wheel comprising a hub of relatively small diameter and side members having rim portions of relatively large diameter around which the chain passes, said side members being spaced apart, said chain comprising traction links having arms extending inwardly at right angles to the tread face of the link, and a pair of triangular connecting cam-links between and connecting adjacent arms, said connecting links having their apex projection's side adapted to engage the hub of the wheel to "break" the links inwardly and retard opening of the traction links, substantially as shown and described.

2. In tractor chain drives, the combination with bifurcated guide wheels having cylindrical hubs and rim members provided with chain receiving recesses; of a chain composed of traction links, each of which inculdes a flat faced traction plate and a truss arm projected at right angles to said plate, each of said links having hinged ears, pins hingedly connecting adjacent links at their ears, cam-tie links located between the adjacent arms of said traction links, each of said cam-tie links having a cam surface to engage with said hubs to "break" the chain as it passes around the wheels and to retard the straightening out of the chain on leaving the wheels, said cam-tie links' cam surfaces being cooperatively associated with the hubs of said wheels, all being arranged substantially as and for the purposes specified.

CLAYTON E. FREDERICKSON.